United States Patent [19]

LaPoint

[11] 4,267,980

[45] May 19, 1981

[54] SEPARATOR

[75] Inventor: Albert E. LaPoint, Socorro, N. Mex.

[73] Assignee: Cal West Metals, Long Beach, Calif.

[21] Appl. No.: 97,489

[22] Filed: Nov. 26, 1979

[51] Int. Cl.³ .................... B02C 23/18; B02C 23/08
[52] U.S. Cl. ...................................... 241/20; 241/81; 209/17; 209/172.5
[58] Field of Search .................. 209/17, 172.5, 172, 209/44; 241/20, 24, 81

[56] References Cited

U.S. PATENT DOCUMENTS

| 3,892,563 | 7/1975 | La Point | 209/3 X |
| 4,055,487 | 10/1977 | Moori | 209/44 |
| 4,098,685 | 7/1978 | Akerlow et al. | 209/10 |

OTHER PUBLICATIONS

Tuya "Separador Conico-Helicoidal", Leon, Spain Group Date Stamp 17 Aug. 79.

Primary Examiner—Ralph J. Hill
Attorney, Agent, or Firm—Richard A. Bachand

[57] ABSTRACT

Apparatus for separating a comixture of light and heavy materials includes a drum divided into two sections. In the first section, the material is introduced with a fluid, and separated from the fluid such that the fluid flows substantially the length of the first section along a "counter flow" path to wash against the material to be separated before overflowing the first section. The material to be separated separates into floating and sinking fractions, the floating fraction overflowing the first section together with the fluid. The sinking fraction is carried by a scroll along the wall of the first section to be lifted into the second section.

In the second section, the sinking fraction is reduced in size by a charge of grinding balls and lifted and removed from the second section.

In another embodiment a fluid section is provided within the first to carry the sinking fraction to near the entrance of the first section to insure its travel therewithin is as long as possible for additional scrubbing or washing by the "counter flow" fluid.

6 Claims, 3 Drawing Figures

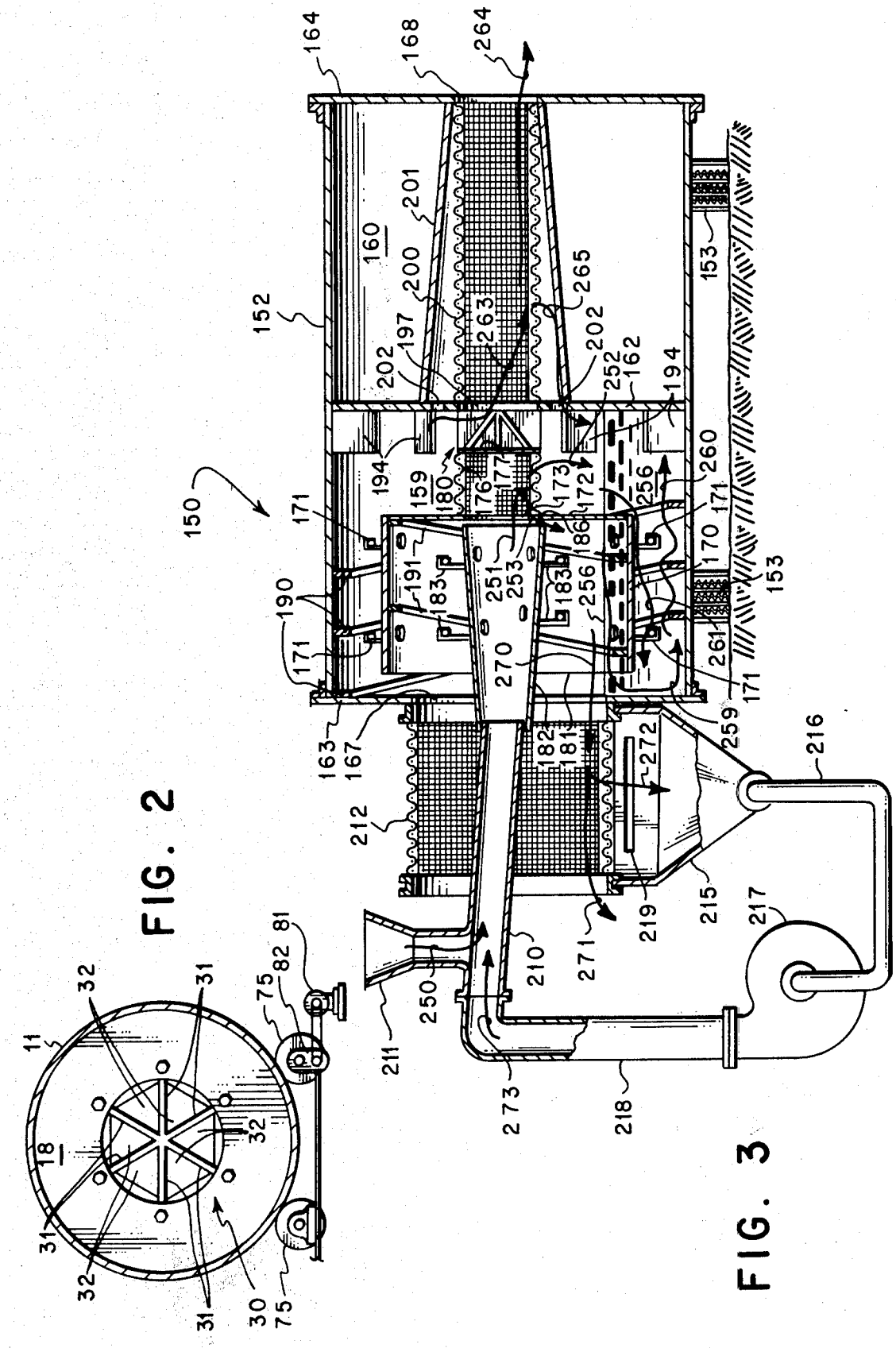

SEPARATOR

BACKGROUND OF THE INVENTION

1. Field of the Invention

The invention relates generally to apparatuses for separating comixed articles. More particularly, the invention relates to an improved method and apparatus for separating materials such as the components of lead-acid batteries, coal or the like from surrounding mined materials accompanying the coal in its removal, sand and gravel, and the like, which may be adherently connected, and for sizing at least a portion of the separated materials to a predetermined minimum size.

2. Description of the Prior Art

The prior art relevant to this invention includes the separators of my prior U.S. Pat. Nos. 3,892,563 and 4,018,567, as well as the background art discussed therein. The aforesaid patents are incorporated herein by reference.

The separators of the aforementioned patents provide a rotating drum into which lead acid storage batteries are introduced at one end. A fluid as well as a charge of grinding balls is included within the drum to degrade and fragment the batteries. As the batteries are fragmented in the drum, a heavy medium suspension of materials from the batteries is formed in the fluid and on which the floatable battery fragments float. The suspension constantly overflows the drum at the end at which the batteries are introduced, carrying with it the floatable battery components. The heavier battery fragments sink within the fluid and are mechanically removed at the opposite end of the drum. A portion of the overflowing suspension is pumped back into the drum together with a regulated quantity of water. The ratio of the recirculated fluid and water is adjusted to control the density of the heavy medium suspension to insure that only the desired battery fragments to be removed at one end float therein. Furthermore, the recirculated fluid is divided into two streams, one stream to be introduced with new battery materials to assist in washing the battery materials into the separator, the other to be introduced at an opposite end of the drum to establish a fluid circulation pattern aimed at flushing the suspension and its floatable components from the opposite end of the drum. Because of the divided recirculation flow path, a valve is employed to control the fluid in the respective flow paths; however, the valve requires some attention to maintain the proper circulation path of the fluid in the drum as well as enabling the suspension density to be maintained, while providing a sufficient quantity of fluid to wash newly injected battery materials into the drum.

SUMMARY OF THE INVENTION

In light of the above, it is, therefore, an object of the invention to provide an improved hydromechanical separator.

It is another object of the invention to provide an improved separator of the type described in which a portion of the fluid contained therewithin is recirculated in a single flow path which assists in carrying newly added material to be separated into the separator as well as establishes a desired overlow circulation path within the separator.

It is another object to the invention to provide a separator of the type described in which the need for apparatus for dividing a recirculating flow stream requiring adjustment for pressure variations has been eliminated.

These and other objects, features and advantages will become apparent to those skilled in the art from the following detailed description when read in conjunction with the accompanying drawing and appended claims.

BRIEF DESCRIPTION OF THE DRAWING

The invention is illustrated in the accompanying drawing, wherein:

FIG. 2 is an end view, partially cut away at 2—2 in FIG. 1.

And FIG. 3 is a side elevation view, in cross section, of an alternative embodiment, in accordance with the principles of the invention, of a separator incorporating a counterflow washing and separating region.

DETAILED DESCRIPTION OF THE PREFERRED EMBODIMENTS

Figure 1:
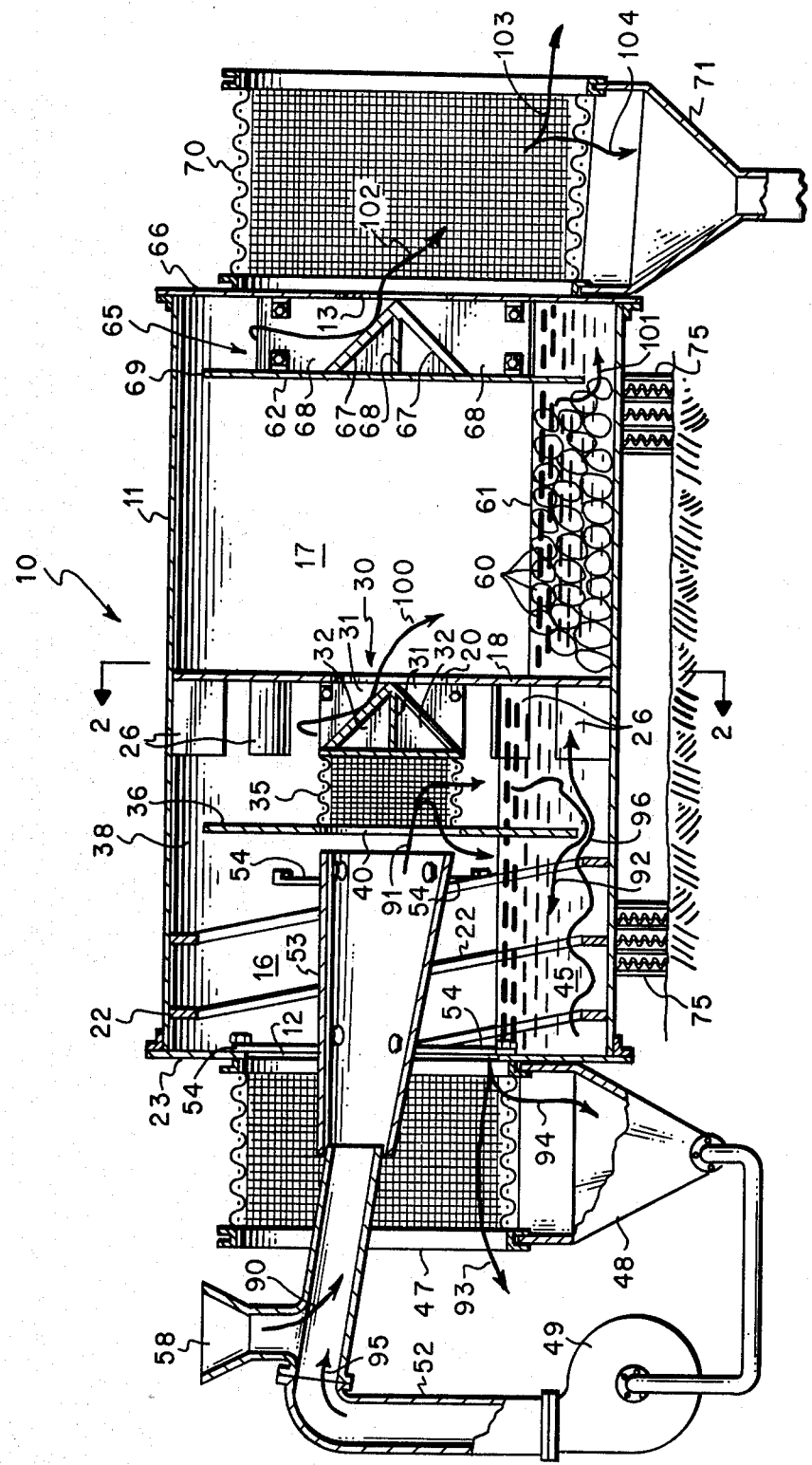
FIG. 1 is a side elevation, in cross section, showing the separator apparatus in accordance with the principles of the invention.

A preferred embodiment of the separator in accordance with the invention is shown in FIG. 1 and denoted generally by the reference numeral 10. The separator 10 includes a drum 11 having openings 12 and 13 at each end thereof. The drum 11 is divided into first and second chambers 16 and 17, respectively, by a partition 18. The partition 18 has a hole 20 at its center to facilitate communication between the chambers 16 and 17, as below described.

With reference now to the first chamber 16 of the drum 11, a scroll 22 is formed on the inside wall of the drum 11 extending from the forward wall 23 to a location midway in the chamber 16. A plurality of lifter plates 26 are provided adjacent to the partition 18 to serve in dropping heavier materials separated by the separator 10 onto a deflector assembly 30. The deflector assembly 30, as can be seen in part by reference to FIG. 2, includes a number of outstanding plates 31 bolted or otherwise attached to the partition 18. The length of the outstanding plates 31 and the length of the lifters 26 determine the length of the gap between them, thereby determining the amount of fluid transported across the gap and deflected into the chamber 17 for a given RPM of the drum, thereby determining the equilibrium density of the fluid 45 (below described) for a given feed. A number of triangular shaped plates 32 are attached to the outstanding plates 31 to form a pyramid shape extending to the partition 18, as shown.

Attached to and extending inwardly from the deflector assembly 30 is a cylindrical trommel screen 35 to which is attached a baffle plate 36. The baffle plate 36 has a centrally located hole 40 through which input material can pass. The baffle plate 36 is of a diameter less than the diameter of the interior of the drum 11 to provide a space 38 thereunder for sinkable material to pass, while concurrently blocking the flotation of any floatable material in the direction of the second chamber 17. A fluid 45 is contained within the first chamber 16 which fills it to the level of the opening 12 in the end wall 23 of the drum 11.

Connected to the end wall 23 of the drum 11 is a trommel 47 beneath which is a fluid output hopper or sump 48 is located. The sump 48 is connected to a recirculating pump 49 which carries fluid overflowing the first chamber 16 through pipe 52 back into the chamber 16.

The input to the chamber 16 is provided via a feed cone 53 attached by braces 54 or the like to the end wall 23 (as shown) or by a chute not attached to the drum assembly (not shown). The feed cone 53 receives its input from the pipe 52 as well as from an input port 58, and has its output aligned with the hole 40 in the baffle plate 38 to enable the contents thereof to be fed to the interior of the trommel screen 35. Furthermore, the diameter of the output end of the feed cone 53 is smaller than the diameter of the hole 40 and is spaced therefrom so that the input material passing the feed cone 53 will be deposited on the trommel screen 35, rather than passing directly into the fluid 45.

The second chamber 17 includes therewithin a charge of crushing balls 60, as well as fluid 61, which may be carried into the second chamber 17 by virtue of the deflector action of the deflector assembly 30. A baffle plate 62 is carried by a deflector assembly 65 upon the end wall 66 of the drum 11. The deflector assembly 65 is fabricated in a fashion similar to that of the deflector assembly 30, and includes a number of plates 68 carrying a pyramidal configured group of triangular shaped plates 67. The deflector plates 68 are welded or bolted (as shown) between the end wall 66 and baffle plate 62, and are of length, unlike that of the deflector assembly 30, to extend to the interior wall of the drum 11 within the chamber 17. Thus, in the separator 10 of FIG. 1, the deflector plates 68 serve to eject any material to the right of the baffle plate 62.

The baffle plate 62 is formed of diameter smaller than the interior diameter of the drum 11 within the chamber 17. The space 69 defined by the smaller diameter of the baffle 62 defines the size of material permitted to pass between the left and right sides of the baffle 62 (as seen in FIG. 1).

A trommel screen 70 is provided at the output of the second chamber 17 adjacent the opening 13 in the end wall 66. A hopper or sump 71 is located beneath the trommel 70 to receive fluid and small sized particles which pass through the trommel screen 70.

The drum 11 itself is carried upon a number of roller and bearing assemblies 75 which enable its rotation about a central axis (not shown). As shown in FIG. 2, the rotation of the drum 11 is achieved by driving two or more of the support rollers 75 by means of a motor 81 and speed reducer 82. The support rollers 75 can conveniently be, for instance, rubber tired wheels.

In operation, materials to be separated are placed within the input port 58 and directed (arrow 90) into the feed cone 53, thence into the trommel screen 35. It will be appreciated that a quantity of recirculated fluid and/or water accompany the input, as will become apparent below.

The input received on the trommel 35 is divided into two portions, a fluid portion which passes through the trommel screen 35 into the chamber 16 to the right of the baffle plate 36, as seen in FIG. 1, and a solid portion which falls between the end of the feed cone 53 and the trommel screen 35 into the chamber 16 to the left of the baffle 36, as seen in FIG. 1 (designated by divided arrow 91). The fluid passes through the trommel screen 35 behind the baffle plate 36 establishes a fluid circulation within the chamber 16 (shown by the arrow 92). Thus, as the material inputted falls between the end of the feed cone 53 and the trommel screen 35 into the fluid 45, it becomes divided into two fractions, a sinking fraction and a floating fraction. The floating fraction is carried by the fluid flow stream (arrow 92) to overflow the chamber 16 through the hole 12 in the end wall 23. The floating fraction is thereafter separated in trommel screen 47 from the overflowing fluid to be removed from the separator at the opening of the trommel screen 47 (as shown by arrow 93). The fluid portion overflowing the chamber 16, on the other hand, passes through the trommel screen 47 to be collected in the hopper or sump 48 (arrow 94). The overflowing fluid is recirculated by a pump 49 through pipe 52 (arrow 95) back into the input stream (arrow 90) into the chamber 16.

The recirculating fluid assists in carrying additional input material into the separator 11 and, in addition, can be employed to adjust the density of the fluid 45 within the chamber 16 of the separator 11, as below described.

Additionally, within the chamber 16, the sinking fraction of the input material is directed by the scroll 22 beneath the baffle plate 36 (arrow 96). This sinking fraction movement is against the fluid flow path (arrow 92) and, therefore, experiences some washing or scrubbing action in the interaction therebetween, which prevents lighter material from floating around the baffle plate 36.

The sinking fraction, when it has been moved by the scroll 22, to the right hand portion of the baffle plate 36, as seen in FIG. 1, is lifted by lifter plates 26 to be dropped onto the deflector assembly 30 and thereby removed into the chamber 17 of the separator 10 (arrow 100). Within the chamber 17, the sinking fraction is abraded and broken up by the charge of balls 60 until it is of sufficiently small size to pass beneath the baffle plate 62 (arrow 101). Once the sinking fraction has passed beneath the baffle plate 62, it is lifted by deflector plates 66 and removed through the opening 13 in the end wall 66 to be emplaced upon the trommel screen 70 (arrow 102). The trommel screen 70 separates the larger fragments for removal through its end (arrow 103), and passes the fluid and smaller portions thereof to hopper or funnel 71 (arrow 104).

As mentioned, the adjustment of the density of the fluid 45 can be affected by merely controlling the amount of water injected into the system (water source not shown). As the material to be separated is injected into the system, a "heavy media" suspension whose density is higher than that of the floating fraction but less than that of the sinking fraction can be established. Thus, by controlling the quantity of the water, the type and quantity of the floatable fraction can be controlled.

It should be noted at this point that the only external operating adjustment which need be made during the operation of the separator 10 is the adjustment of the ratio of the water to the recirculating fluid. Since the input material and recirculating fluid are injected well within, and almost to the rear of the chamber 16, and are carried by the counter flow established therewithin, the single fluid input provided by the recirculating fluid is all that is needed to effect efficient operation.

An alternative embodiment for the separator in accordance with the principles of the invention is shown in FIG. 3, and is denoted generally by the reference numeral 150. Like the separator 10, the separator 150 includes a drum 152 carried upon rollers or support means 153. The drum 152 can be rotated by a system like that described above with the reference to FIG. 2.

The drum 152 has two chambers 159 and 160 separated by a partition 162. End plates 163 and 164 enclose the drum 152 except for the holes 167 and 168 formed respectively therethrough.

A secondary drum 170 is carried within the chamber 159 mounted, for example, by braces or struts 171, as shown, to be aligned along a central axis (not shown) of the drum 152. The secondary drum 170 includes an end plate 172 having a hole 173 there through which input material passes, as below described. A trommel screen 176 is mounted to the end plate 172 on the secondary drum 170 and is enclosed by a plate 177, forming a part of the deflector assembly 180, below described in detail. The other end 181 of the secondary drum 170 is open to enable materials to freely pass from its interior.

An input cone 182 is carried by the secondary drum 170, and can be mounted to it by struts 183, as shown. A chute not attached to the drum (not shown) may be used if desired. The input cone 182 is axially lined with the secondary drum 170 and with the hole 173 in the end plate 172 of the secondary drum 170. The end 186 of the input cone 182 is spaced from the end plate 172 to permit input materials to pass therebetween, as below described. The diameter of the input cone 182 is slightly less than the diameter of the hole 173 such that when input materials pass through the input cone 182, they will be injected into the trommel screen 176, rather than falling the space between the end 186 of the input cone 182 and the partition 172.

A scroll 190 is attached to the inner wall of the drum 152 within the first chamber 159, as shown, to carry a sinking fraction within the drum 159 in the direction of the partition 162, as will be described in detail below. On the other hand, a scroll 191 is formed upon the interior wall of the secondary drum 170 in an opposite direction to the scroll 190. The scroll 191 serves to carry the sinking fraction within the secondary drum 170 in the direction of the end plate 163 of the drum 152.

The end wall 181 of the secondary drum 170 is spaced from the end plate 163 to permit materials carried by the scrolls 191 within the secondary drum 170 to be dropped between the plate 163 and the end 181 of the secondary drum 170 into the chamber 159 for further processing.

Additionally, within the chamber 159, the deflector assembly is carried, in a fashion similar to the deflection assembly 30 described above with respect to the separator 10. The plurality of lifter plates 194 are provided, attached to the interior wall of the drum 152 adjacent the partition 162, as shown.

The partition 162 has a centrally located hole 197 adjacent the deflector assembly 180 through which processed materials pass. A trommel screen 200 is attached between the partition 162 and the end plate 164 of the chamber 160. The trommel screen 200 is axially aligned with the drum 152 and with the respective holes 197 and 168.

A fluid return cone 201 surrounds the trommel screen 200 between the end plate 164 and partition 162. Finally, a plurality of apertures 202 are formed through the partition 162 and are enclosed by the fluid return cone 201, whereby fluid within the cone 201 will be returned from the chamber 160 through the partition 162 back into the chamber 159.

At the input end of the drum 152, an input pipe 210 is provided, in communication with the cone 182. A funnel 211 or the like is provided to the pipe 210 and into which material to be separated can be placed.

Additionally, an output trommel screen 212 is attached to the end plate 163 of the drum 152, aligned with the hole 167 therethrough. The trommel screen 212 is carried above an output hopper or funnel 215, which receives overflowing fluid from the chamber 159 to be recirculated through a pipe 216 to a pump 217 back to the input pipe 210 through pipe 218.

In operation, material to be separated, such as coal from its surrounding materials, gravel from sand, or the like, is inserted through funnel 211 together with water or other carrying fluid (fluid source not shown) (arrow 250). The input material is conducted through the pipe 210 and input cone 182 to be deposited within the trommel screen 176 (arrow 251). Within the trommel screen 176, the fluid portion of the input material passes directly into the chamber 159 (arrow 252). The solid material separated from the fluid by the trommel screen 176 falls into the interior of the secondary drum between the end 186 of the input cone 182, and the end plate 172 thereof (arrow 253). Within the secondary drum 170, the input material is immersed within a fluid bath 256, wherein it is separated into a floating fraction and a sinking fraction. The sinking fraction is carried by the scrolls 191 within the secondary drum 170 to be deposited between the end 181 of the secondary drum 170 and the end plate 163 into the chamber 159 (arrow 259). Within the chamber 159, the sinking fraction is then carried by the scrolls 190 in the direction of the partition 162 (arrow 260). On the other hand, since the input fluid passing the trommel screen 176 travels in an opposite direction to the sinking fraction within the chamber 159 (arrow 261), the sinking fraction carried by the scrolls 190 toward the partition 162 is subjected to additional scrubbing action due to the fluid velocity flowing in the opposite direction. The sinking fraction reaching the region of the partition 162, is then lifted by lifter plates 194 to be dropped thereby onto the deflector assembly 180 to be moved into the trommel screen 200 within the chamber 160 (arrow 263). The sinking fraction thus removed is thereafter removed from the trommel screen 200 through the hole 168 and the end plate 164 for use (arrow 264). On the other hand, any fluid which may be removed from the chamber 159 along with the sinking fraction is separated by the trommel screen 200 and allowed to fall onto the fluid return cone 201 to be returned to the first chamber 159 (arrow 265).

Meanwhile, the floating fraction within the chamber 159 is overflowed through the hole 167 in the end plate 163 and into the trommel screen 212 (arrow 270). The floating fraction of sufficient size to not pass through the screen of the trommel screen 212 is removed through its end (arrow 271), whereas the fluid and the portion of the floating fraction which is permitted to pass the trommel screen 212 is caught by funnel or hopper 215 for recirculation (arrow 272). The fluid portion received by the funnel 215 is recirculated by the pump 217 through the pipes 216 and 218 to be directed back into the input through pipe 210 along with any additional input material which may be placed within the hopper or funnel 211 (arrow 273). As before, with respect to the separator 10, the fluid density of the fluid bath 256 within the chamber 159 can be adjusted or controlled by varying the amount of water or other fluid inserted into the system, or, if desired, by varying the quantity of fluid or rate of the recirculation of the fluid back into the chamber 159. Any excess fluid is removed from the system by overflow spout 219 on the sump 215.

Although the invention has been described and illustrated with a certain degree of particularity, it is understood that the present disclosure has been made only by way of example and that numerous changes in the combination and arrangement of parts may be resorted to by those skilled in the art without department from the spirit and the scope of the invention as hereinafter claimed.

What is claimed:

1. Apparatus for separating an input material having floating and sinking fractions, comprising:
    a separation container with two ends, one end for overflowing the floating fraction, and another end for discharging the sinking fraction;
    an input flow stream to introduce the fractions to be separated and a fluid near the sinking fraction discharging end;
    a partition inside the container to isolate the floating fraction to the floating fraction overflowing end;
    means to separate fluid from the input flow stream to introduce at least a part of the input flow stream behind the partition, whereby the fluid flow is established in a direction from the sinking fraction discharging end to the floating fraction overflowing end past the partition;
    means for moving the sinking fraction in a direction opposite the fluid flow path past the partition toward and out of the sinking fraction discharging end and substantially in contact with the flow stream to be scrubbingly contacted thereby;
    and means for returning fluid overflowing the container at the floating fraction overflowing end to the input flow stream.

2. The apparatus of claim 1 further comprising:
    a secondary sizing container for receiving the sinking fraction from the sinking fraction discharging end;
    a quantity of grinding balls in the sizing container to reduce the size of the sinking fraction therein;
    a partition in said sizing container to permit only sinking fraction particles of at least a predetermined small size pass;
    and means for discharging the sinking fraction which has passed the partition from said sizing container.

3. The apparatus of claim 1 further comprising a secondary scrubbing container in the separation container to carry the sinking fraction in a bath containing the floating fraction to a location near the floating fraction overflowing end, and discharging the sinking fraction into the separation container.

4. Apparatus for separating a material having mixed floating and sinking fractions, comprising:
    means for providing a fluid stream,
    a first enclosed drum having an interior chamber receiving said fluid stream, one end of said drum having an overflow opening for overflowing fluid from within said first drum;
    a second drum carried within said interior chamber of said first drum, partially within said fluid in said first drum, said second drum having an open end and an enclosed end, said enclosed end having a central opening therethrough;
    an enclosed screen container carried within said interior chamber of said first drum adjacent the central opening of said enclosed end of said second drum;
    means for introducing the material to be separated together with said fluid stream into said screen container;
    whereby materials retained by said screen container overflow into said second drum and fluid and materials passing through said screen container fall into said first drum to establish a fluid current within said first drum between said screen container and said overflow opening of said first drum, and whereby a portion of said floating fraction of said materials which overflow into said second drum is separated in said fluid from said sinking fractions;
    means for agitatively moving said sinking fraction within said second drum toward said open end of said second drum, whereby said sinking fraction within said second drum is further separated from said floating fractions, and the sinking fraction is introduced into said first drum;
    means for agitatively moving said sinking fraction introduced into said first drum in a direction opposite said fluid current, whereby said fluid current scrubs said sinking fraction to still further separate floating fraction therefrom, and overflows said floating fraction through said overflow opening of said first drum,
    and means for removing said sinking fraction from said first drum.

5. The apparatus of claim 4, further comprising means for recirculating fluid overflowing said first container, whereby the adjustment of the quantity ratio of fluid of said fluid stream to the material to be separated controls the density of the fluid within said first drum.

6. The apparatus of claim 4, wherein said means for agitatively moving said sinking fraction in said second drum is a scroll on a wall of said second drum and wherein said means for agitatively moving said sinking fraction within said first drum is a scroll on a wall of said first drum.

* * * * *